United States Patent [19]
LeMonds et al.

[11] Patent Number: 5,469,618
[45] Date of Patent: * Nov. 28, 1995

[54] METHOD FOR MANUFACTURING HOLLOW AIRFOILS (TWO-PIECE CONCEPT)

[75] Inventors: Jeffrey LeMonds, Clifton Park; James E. McConnelee, Delanson, both of N.Y.; John R. Kelley, Cincinnati; Gene E. Wiggs, West Chester, both of Ohio; Gary T. Martini, Milford, Mich.

[73] Assignee: General Electric Company, Schenectady, N.Y.

[*] Notice: The portion of the term of this patent subsequent to Sep. 14, 2010, has been disclaimed.

[21] Appl. No.: 162,212

[22] Filed: Dec. 6, 1993

[51] Int. Cl.$^6$ .................................................. B23P 15/00
[52] U.S. Cl. ..................... 29/889.72; 29/463; 29/889.7
[58] Field of Search .............................. 29/889.72, 889.7, 29/463; 228/157, 143, 234

[56] References Cited

U.S. PATENT DOCUMENTS

| | | | |
|---|---|---|---|
| 2,982,012 | 5/1961 | Wilkins et al. | 29/157 |
| 3,628,226 | 12/1971 | Nelson | 29/156.8 H |
| 3,736,638 | 6/1973 | Stone, Jr. | 29/156.8 H |
| 3,920,175 | 11/1975 | Hamilton et al. | 228/173 |
| 3,927,817 | 12/1975 | Hamilton et al. | 228/157 |
| 3,934,441 | 1/1976 | Hamilton et al. | 72/60 |
| 3,936,920 | 2/1976 | Conn, Jr. | 29/156.8 B |
| 4,043,498 | 8/1977 | Conn, Jr. | 228/265 |
| 4,089,456 | 5/1978 | Toppen et al. | 228/195 |
| 4,217,397 | 8/1980 | Hayase et al. | 428/594 |
| 4,294,419 | 10/1981 | Fouse et al. | 244/117 R |
| 4,392,602 | 7/1983 | Darby | 228/118 |
| 4,426,032 | 1/1984 | Leodolter | 228/157 |
| 4,526,312 | 7/1985 | Goss et al. | 228/157 |
| 4,530,197 | 7/1985 | Rainville | 52/797 |
| 4,642,863 | 2/1987 | Schulz | 29/156.8 B |
| 4,811,890 | 3/1989 | Dowling et al. | 228/157 |
| 4,882,823 | 11/1989 | Weisert et al. | 29/6.1 |
| 4,934,580 | 6/1990 | Sutton | 228/157 |
| 5,024,369 | 6/1991 | Froes et al. | 228/157 |
| 5,063,662 | 11/1991 | Porter et al. | 29/889.72 |
| 5,083,371 | 1/1992 | Leibfried et al. | 29/889.72 |
| 5,099,573 | 3/1992 | Krauss et al. | 29/889.72 |
| 5,240,376 | 8/1993 | Velichi | 29/889.72 |
| 5,243,758 | 9/1993 | Lemonds et al. | 29/889.72 |
| 5,253,419 | 10/1993 | Collot et al. | 29/889.72 |
| 5,285,573 | 2/1994 | Lemonds et al. | 29/889.72 |

FOREIGN PATENT DOCUMENTS 500458   8/1992   European Pat. Off. .

*Primary Examiner*—Irene Cuda
*Attorney, Agent, or Firm*—Patrick R. Scanlon; Paul R. Webb, II

[57] ABSTRACT

A method is provided for making a two-piece hollow airfoil having a complex geometry. Two metal sheets are formed into initial shapes so as to have a mean camber and twist. A series of raised ribs is machined onto the external side of each of the two sheets. The two sheets are joined together and sealed to form an in-process assembly. The assembly is subjected to high temperature and pressure to diffusion bond the sheets together at selected points. The assembly then subjected to internal pressure at high temperature in order to inflate and superplastically deform the assembly to the desired shape. Excess material is machined off after the inflation step.

19 Claims, 7 Drawing Sheets

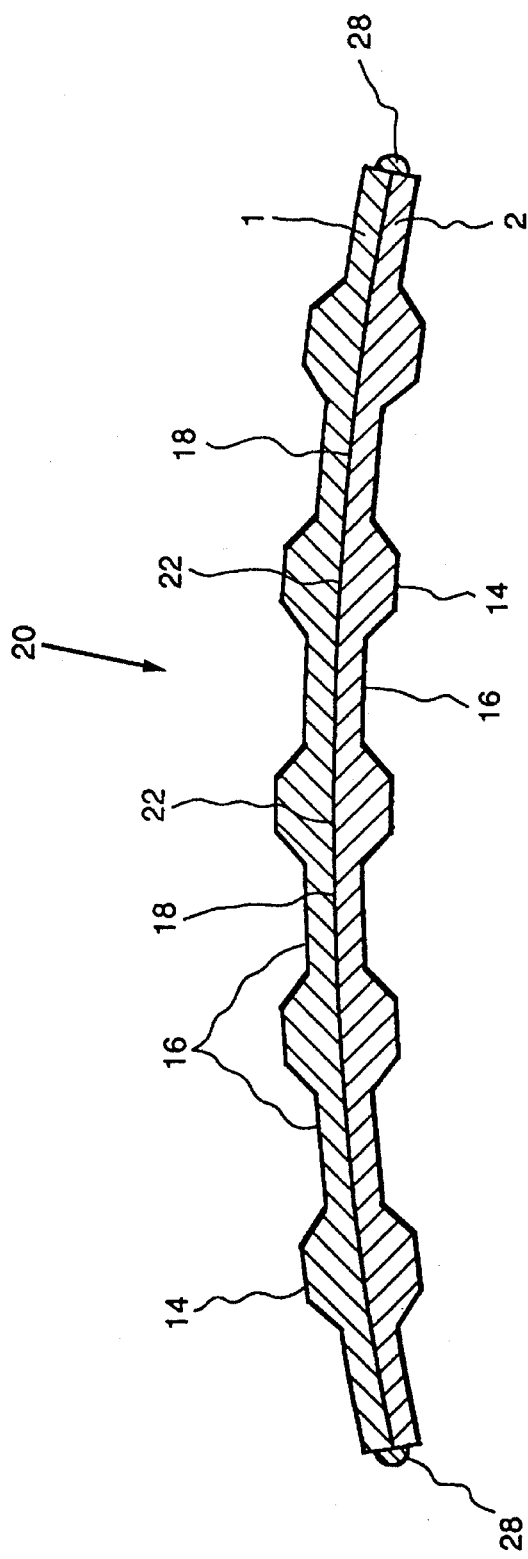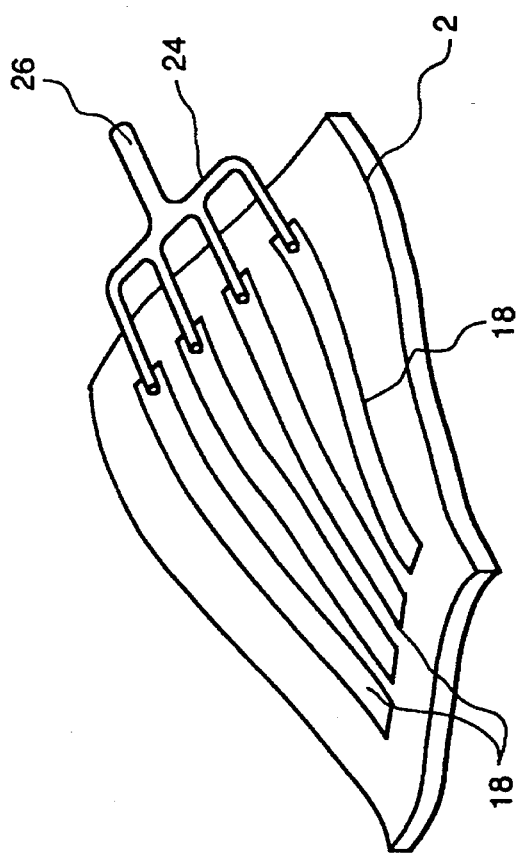

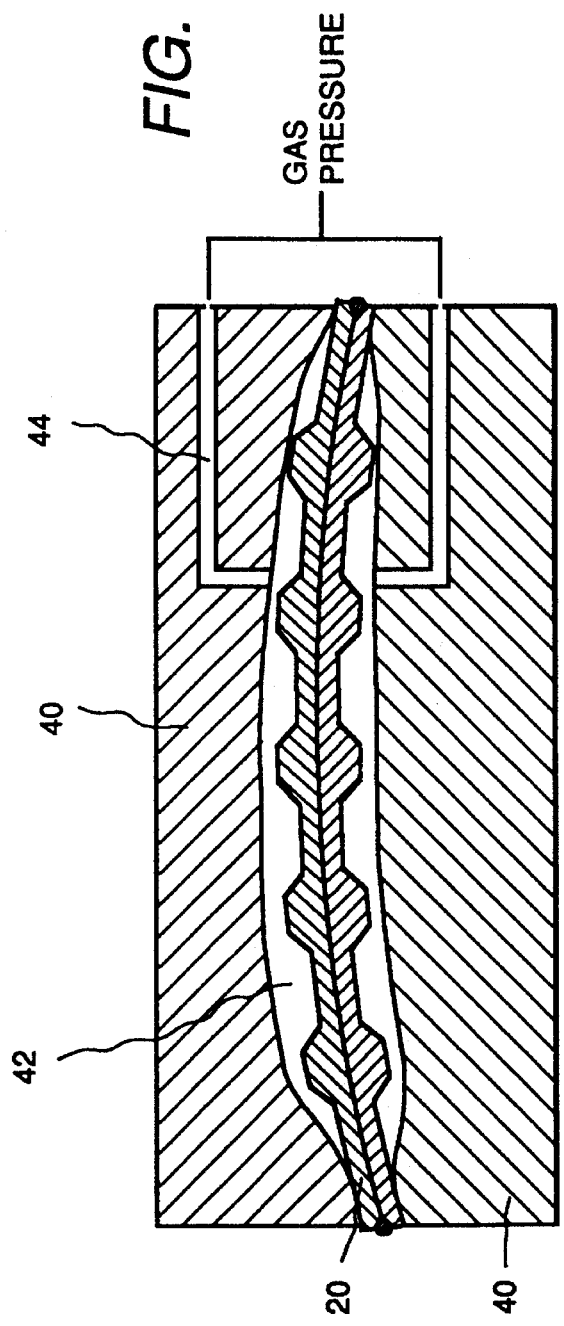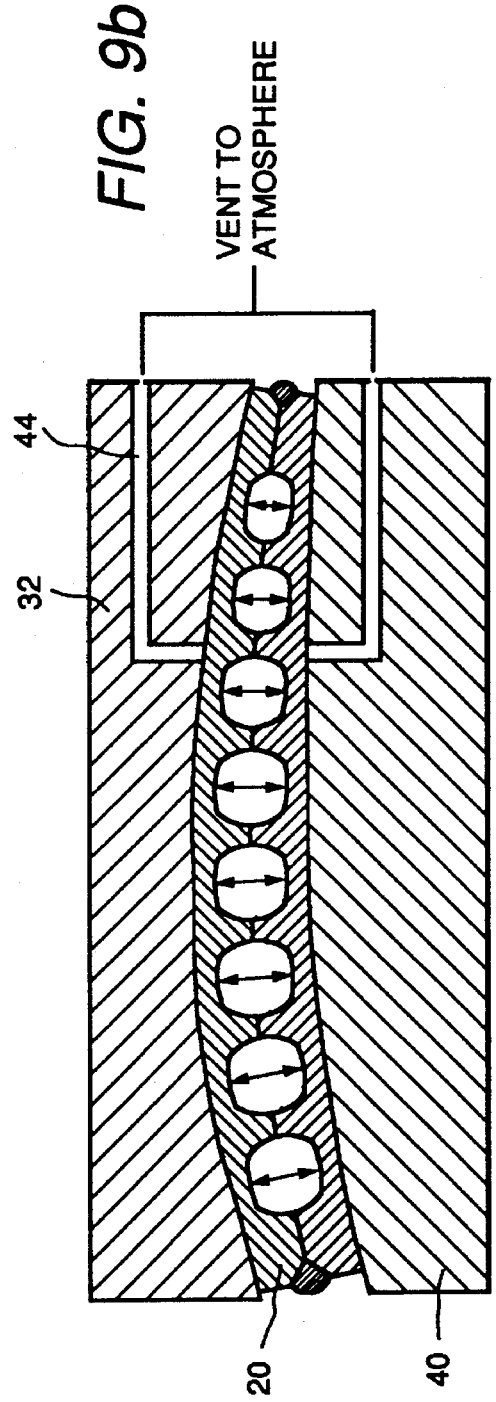

METHOD FOR MANUFACTURING HOLLOW AIRFOILS (TWO-PIECE CONCEPT)

BACKGROUND OF THE INVENTION

This invention relates generally to fabricating hollow airfoils and more particularly concerns a method of producing lightweight, high-strength hollow airfoils using diffusion bonding and superplastic forming techniques. This method is particularly useful in making hollow titanium aircraft engine blades for integrally-bladed rotors.

Hollow airfoils are utilized in gas turbine engines to reduce the weight of the engine. Weight reduction becomes vitally important as the gas turbine engine thrust is increased. One of the ways that thrust is increased is by increasing engine size. As the engine size increases, individual part size and part weight also can increase. In the past, weight reduction has been accomplished by developing strong, lightweight alloys. For airfoils such as aircraft engine blades, which typically are solid for smaller engines, the increase in size precludes the use of solid airfoils because of the substantial weight gain, even when lightweight materials such as titanium alloys are used. In order to produce useful but light aircraft engine blades without incurring unacceptable weight penalties, it is necessary to manufacture either composite blades or hollow metallic blades.

Hollow metallic blades are frequently formed by taking advantage of the superplastic forming and diffusion bonding behavior of certain metals. Superplastic forming is a technique that relies on the capability of certain materials, such as titanium alloys, to develop unusually high tensile elongation with a minimal tendency towards necking when submitted to coordinated time-temperature-strain conditions within a limited range. Superplastic forming is useful in producing a wide variety of strong, lightweight articles.

Many of the same materials used in superplastic forming are also susceptible to diffusion bonding. Diffusion bonding is a process which forms a metallurgical bond between similar parts which are pressed together at elevated temperature and pressure for a specific length of time. Bonding is believed to occur by the movement of atoms across adjacent faces of the parts. Diffusion bonding provides substantial joint strength with little geometrical distortion and without significantly changing the physical or metallurgical properties of the bonded material.

It has long been desirable to fabricate various aircraft components, such as door panels and wing flaps, as hollow bodies. The benefits of such include a substantial reduction in weight which provides improved fuel efficiency and increased thrust-to-weight ratio. Despite the increasing popularity in applying diffusion bonding and superplastic forming (DB/SPF) techniques to the manufacture of aircraft components, there are many critical problems to overcome in successfully forming a hollow airfoil. Parts formed using DB/SPF techniques have very complex geometries, exhibit highly non-linear material behavior, and are subject to large irreversible strains. Thus, there exists the possibility of many deformation-induced instabilities, such as necking, grooving, buckling and shear localization, which substantially weaken the structural integrity of the part.

The stringent requirements for both the external aerodynamic shape and internal structure of hollow airfoils present another problem in the manufacture of such parts. In order to produce the desired final shape and thickness, the proper in-process shape (i.e., the shape and size of a part prior to superplastic deformation) must be known.

Accordingly, there is a need for a method of manufacturing hollow airfoils having aerodynamic shapes and complex geometries using superplastic forming and diffusion bonding. Particularly, there is a need for such a method which can achieve the final desired shape and thickness without compromising the physical and metallurgical properties of the bonded metal while alleviating problems of deformation-induced instabilities.

SUMMARY OF THE INVENTION

The above-mentioned needs are met by the present invention in which hollow airfoils are manufactured by first forming first and second sheets into respective predetermined in-process shapes. Each of the two sheets, which are preferably made of a titanium-based alloy, has an interior side, an exterior side and a mean camber and twist. Next, a series of raised ribs is machined onto the exterior sides of each sheets, and stopoff is applied to selected portions of the interior side of at least one of the sheets. The two sheets are then arranged with their interior sides in contact to form an in-process assembly. The space between the sheets is evacuated, and the sheets are then sealed together by welding around their peripheries. External pressure is applied to the in-process assembly so that portions of the interior sides of the two sheets lacking stopoff diffusion bond together. Subsequently, the in-process assembly is subjected to internal pressure so that it superplastically deforms to the desired shape. After superplastic deformation, excess material is machined off.

The steps of forming the sheets into their in-process shapes can be accomplished by hot forming the sheets in a hot form press. The sheets can additionally be superplastically formed with a superplastic forming tool after hot forming. As another alternative, the sheets can be near-net-shape forged in a forge press to produce the in-process shapes.

The step of applying external pressure to the in-process assembly comprises placing the in-process assembly into an autoclave and applying a pressure in the range of approximately 60–500 psig for up to three and a half hours at a temperature in the range of 1600°–1800° F. Then the step of applying internal pressure to the in-process assembly comprises placing the in-process assembly in a die and applying pressure to the cavities at a ramp rate of approximately 1–20 psig per minute to a maximum in the range of 60–500 psig for a total of up to two and a half hours at a temperature in the range of 1500°–1700° F.

Alternatively, the in-process assembly can be externally pressurized by placing the in-process assembly into a die having a die cavity and passage means for permitting fluid communication between the die cavity and the atmosphere and then applying a pressure in the range of 60–500 psig in the die cavity for up to three and a half hours via the passage means. This application of external pressure is carried out at a temperature in the range of 1600°–1800° F. The application of internal pressure to the in-process assembly can then be accomplished by leaving the in-process assembly in the die, venting the die cavity to the atmosphere via the passage means, and applying internal pressure to the in-process assembly at a ramp rate of approximately 1–20 psig per minute to a maximum in the range of 60–500 psig for a total of up to two and a half hours at a temperature in the range of 1500°–1700° F.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 4 shows the two sheets arranged in the in-process assembly;

FIG. 5 shows the interior side of one of the sheets and the inflation gas manifold;

FIGS. 9a and 9b show a variation of the diffusion bonding and superplastic forming steps of the present invention.

DETAILED DESCRIPTION OF THE INVENTION

Figure 1:
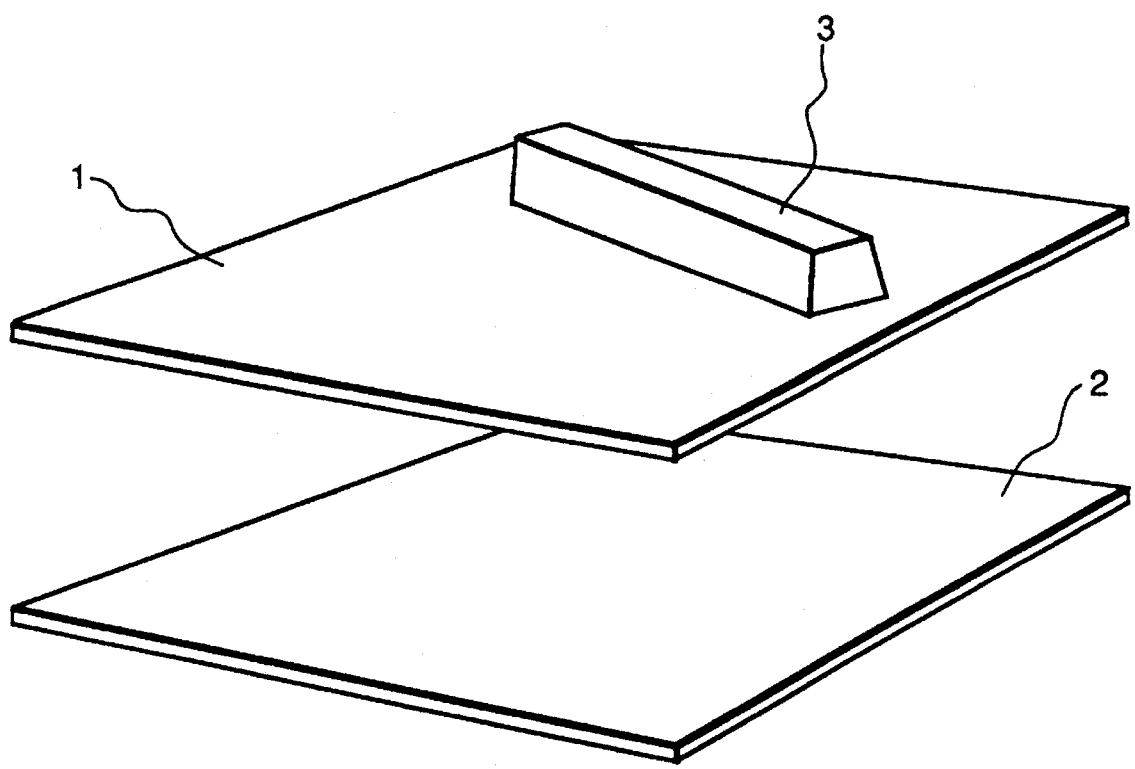
FIG. 1 shows the two metallic sheets used in the method of the present invention.

Turning first to FIG. 1, the components used in making a hollow airfoil by the present invention are shown. In accordance with the present invention, two machined sheets 1,2 are provided. The sheets 1,2 are preferably made of, for example, a titanium alloy having a nominal composition in weight percent of 6% aluminum, 4% vanadium and the balance titanium and incidental impurities, hereinafter referred to as Titanium-6Aluminum-4Vanadium, but can be any material capable of superplastic forming and diffusion bonding. For instance, another suitable material is titanium Alloy 550 which is a titanium alloy having a nominal composition in weight percent of 4% aluminum, 2% tin, 4% molybdenum, 0.5% silicon and the balance titanium and incidental impurities. Each sheet 1,2 is provided with an oversized root 3 which provides a means for attaching the finished blade to the hub of an aircraft engine.

Figure 2:
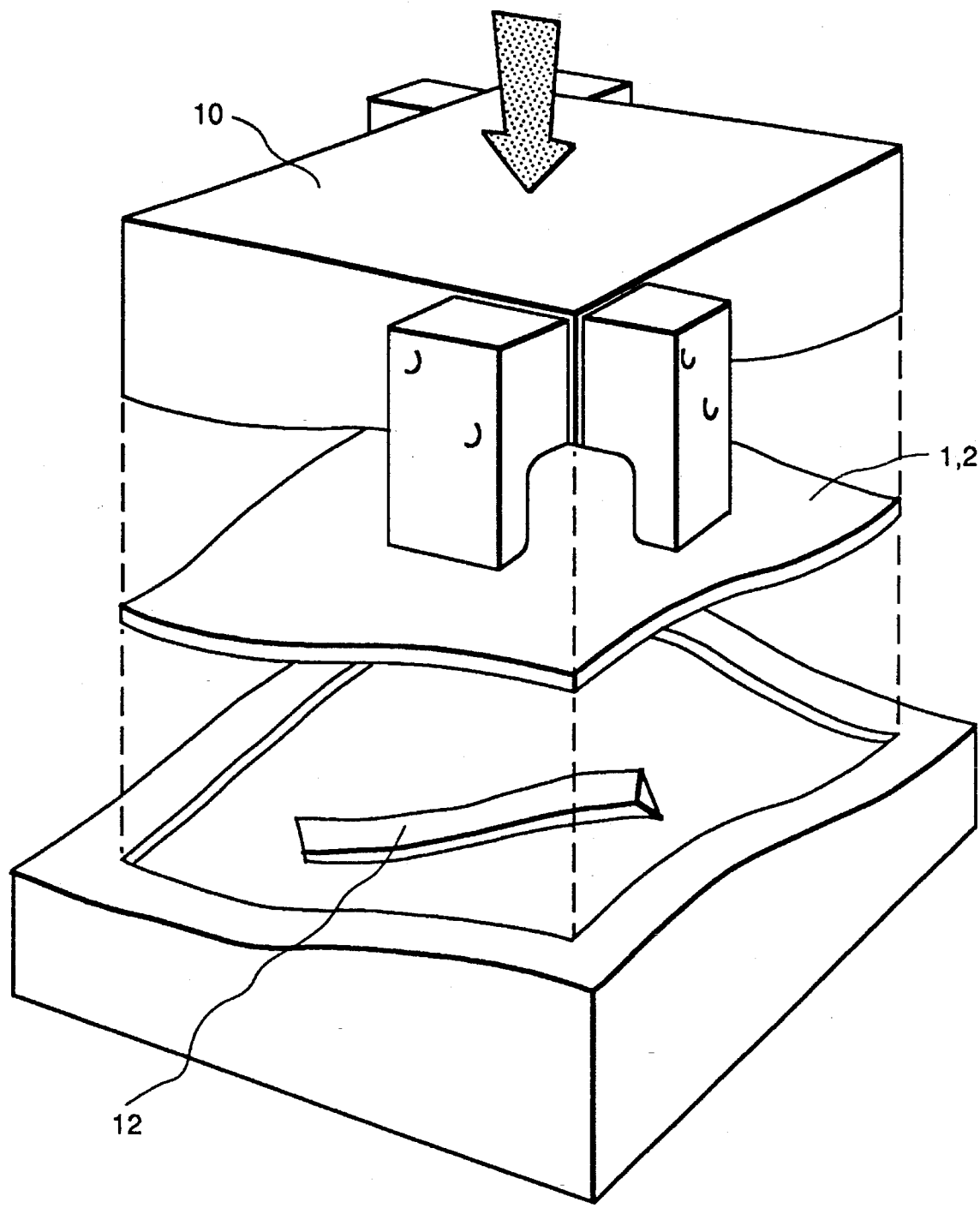
FIG. 2 shows the step of initially forming the sheets.

Initially, the sheets 1,2 must be formed into their in-process shapes before a subsequent superplastic forming procedure can be carried out. The in-process shape is the shape each respective part must take prior to superplastic forming to ensure that the desired final shape and thickness will be achieved after deformation. FIG. 2 shows the first step in which the sheets 1,2 are hot formed in a hot form press 10. (For simplicity, only one sheet is shown). A groove 12 is provided in the lower die of the hot form press 10 to accommodate the root 3 on each sheet 1,2. The first sheet 1 is formed with a convex exterior side, while the other sheet 2 is provided with a concave exterior side. The titanium-alloy sheets 1,2 are hot formed in the press 10 for approximately one hour at about 1600° F. These times and temperatures may be varied significantly, with longer times required for lower temperatures and correspondingly shorter times for higher temperatures. Different times and temperatures will be required for different alloys.

Each sheet 1,2 is thus provided with a mean camber and twist parallel to the final mean camber surface of the finished airfoil. This represents a distinct departure from conventional airfoil forming processes which typically defer the cambering and twisting operations until after the airfoil halves have been diffusion bonded together and require significant removal of material after diffusion bonding. Consequently, the present invention provides the clear advantage of enabling inspection and determination of critical dimensions such as wall thickness before the sheets 1,2 are diffusion bonded together. With conventional processes, the sheets cannot be adequately inspected after the cambering and twisting operations because they are already diffusion bonded together. To preclude the prospect of insufficient wall thickness in such methods, excess material stock is designed into the airfoil configuration, and this excess stock represents undesirable added weight.

In the preferred embodiment described above, the sheets 1,2 are formed into their in-process shapes by hot forming alone. Alternatively, the sheets 1,2 can be formed by a two-step procedure in which the sheets 1,2 are initially hot formed and then superplastically deformed to the in-process shape in a superplastic forming (SPF) tool. The two-step forming process is particularly useful when relatively thick sheets are required, thinner sheets being easier to shape. As another alternative, the sheets 1,2 may be near-net-shape forged to the desired in-process shape. Near-net-shape forging is carried out in a forge press at a high temperature on the order of approximately 1700° F.

Figure 3:
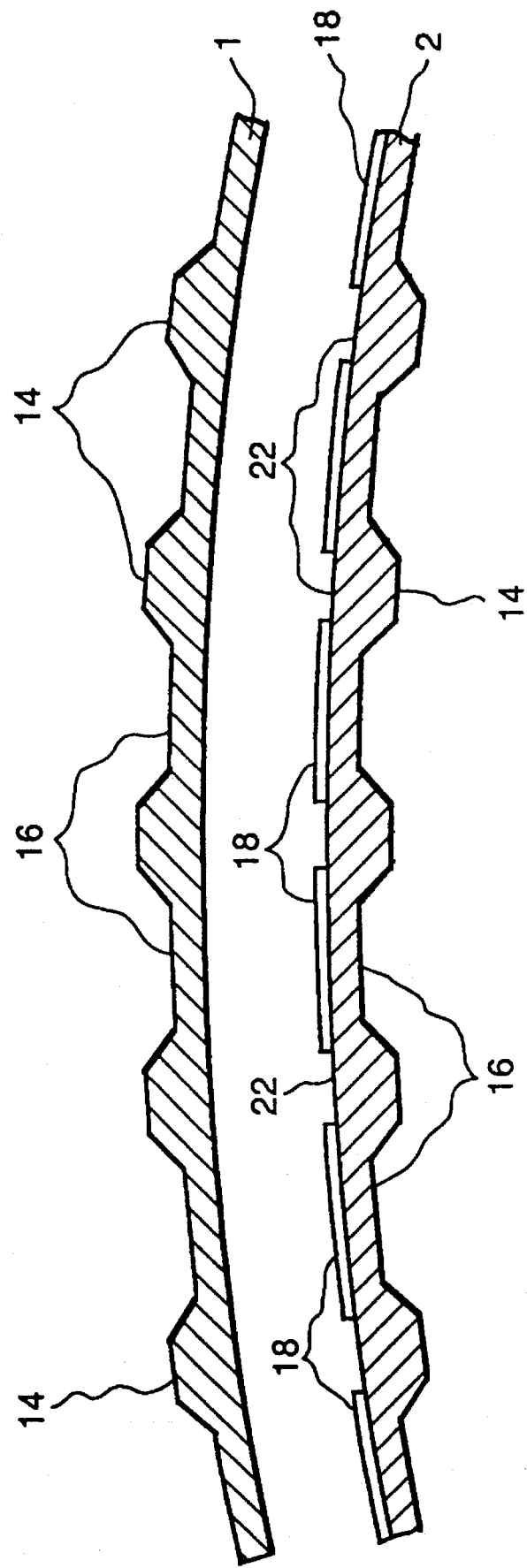
FIG. 3 shows both sheets having their exterior sides machined and stopoff applied to the interior side of one sheet.

Next, a sculptured surface is machined, preferably by precision milling, onto the exterior sides of the sheets 1,2. As seen in FIG. 3, the exterior side of each sheet 1,2 is provided with a series of raised ribs 14 separated by recesses 16. The ribs 14 preferably, but not necessarily, extend lengthwise along the sheets 1,2 and are substantially parallel. A stopoff material 18 such as yttrium oxide is applied to the interior side of one of the sheets 1,2 (for example, sheet 2). Application of the stopoff 18 is limited to the area of the interior side which is opposite to the recesses 16. No stopoff 18 is applied to the area of the interior side which is opposite to the ribs 14. The stopoff 18 prevents the sheets 1,2 from diffusion bonding at the locations where it is applied.

The sheets 1,2 are placed together with their respective interior sides in contact to define an in-process assembly 20 as shown in FIG. 4. The sheets 1,2, having been previously shaped to their in-process shapes, fit snugly together in contacting relationship and are situated so that the ribs 14 on each sheet are substantially aligned. Thus, the surfaces of the interior side of the sheet 2 to which no stopoff 18 is applied directly contact the corresponding interior surfaces of the sheet 1, thereby defining bond lands 22 which are located between corresponding ribs 14 of the sheets 1,2. An inflation gas manifold 24 (FIG. 5) having an externally-protruding inflation port 26 is disposed between the sheets 1,2 (only one sheet shown in FIG. 5) in order to provide a gas inlet to the interior surfaces to which stopoff 18 is applied.

After all of these elements have been so arranged, the space between the two sheets 1,2 is evacuated, and a seal weld 28 is applied around the periphery of the in-process assembly 20 to seal the elements together. Welding serves to hold the sheets 1,2 together during subsequent processing and substantially seals the interior of the in-process assembly 20 from the exterior atmosphere. Any low distortion welding method may be used. Preferred welding methods include electron beam (EB) welding or a low heat input tungsten-inert gas (TIG) method.

Figure 6:
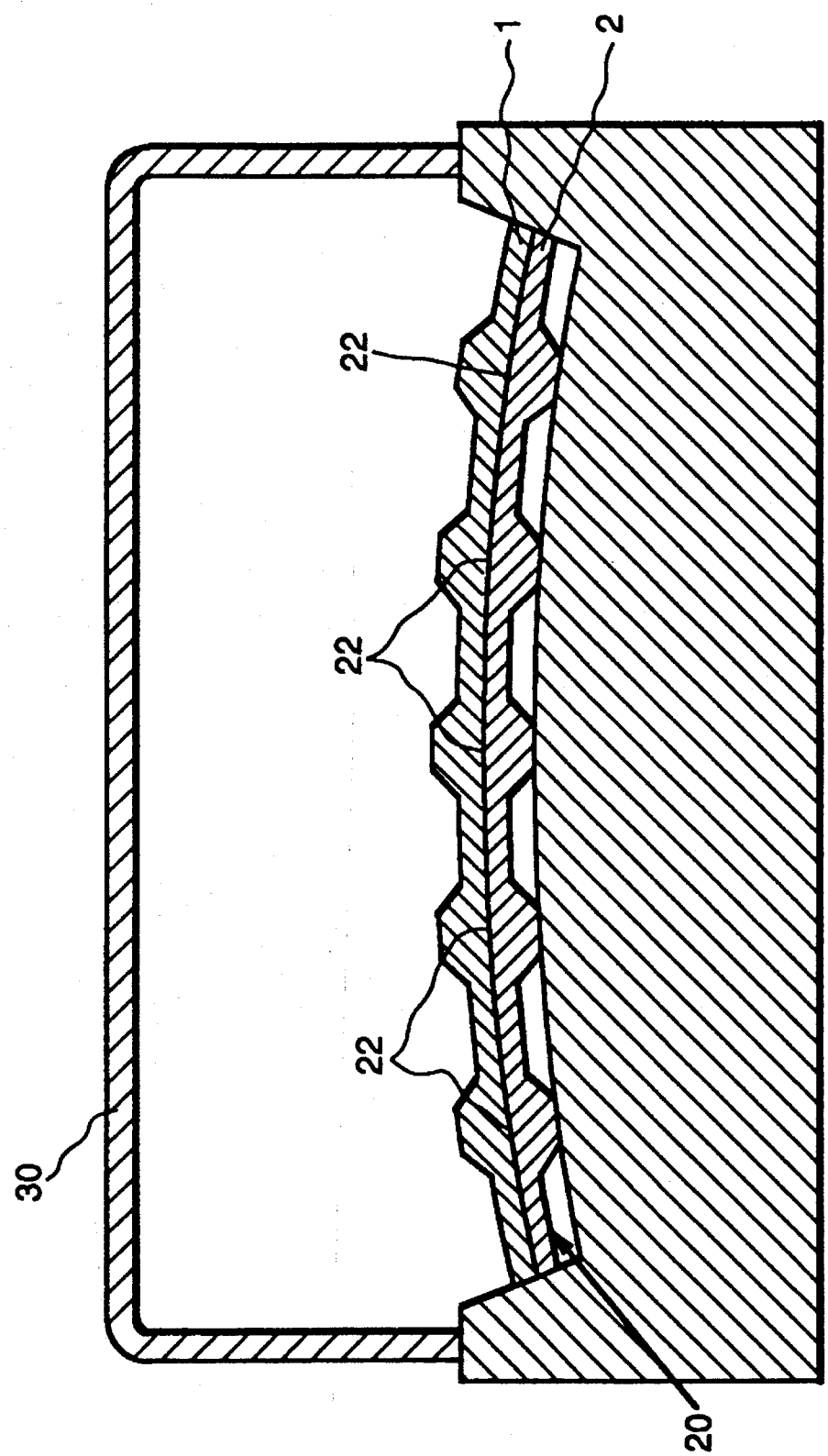
FIG. 6 shows the diffusion bonding step of the present invention.

The next step is to diffusion bond the two sheets 1,2 together as shown in FIG. 6. The in-process assembly 20 is placed in an autoclave 30 or any other chamber capable of providing pressure and temperature conditions sufficient to cause diffusion bonding. The autoclave 30 is sealed and heated to a temperature in the range of approximately 1600°–1800° F., preferably 1750° F. At this temperature, a pressure of approximately 300 pounds per square inch gauge (psig) or at least in the range of 60–500 psig is externally applied (by means of an inert gas such as argon) to the assembly 20 in the autoclave 30 for up to three and a half hours. Under these temperature-pressure-time conditions, the sheets 1,2 will diffusion bond to each other at all locations where no stopoff is applied, i.e., the bond lands 22.

Figure 7:
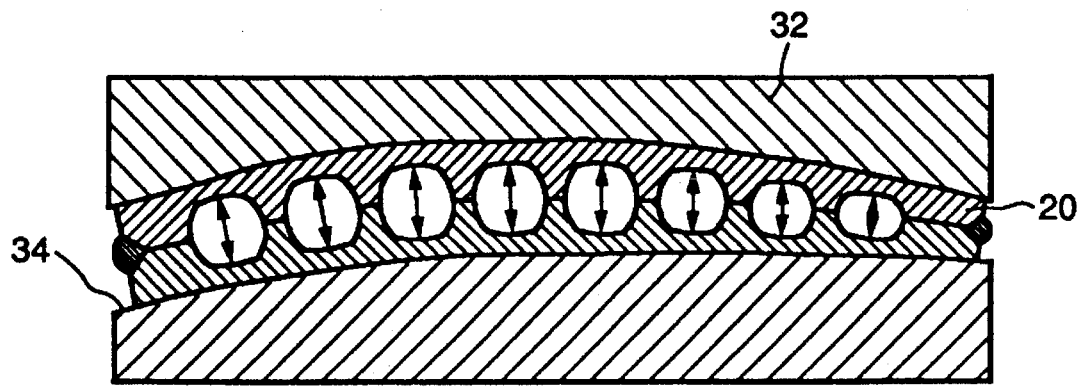
FIG. 7 shows the superplastic forming step of the present invention.

After diffusion bonding is completed, the in-process assembly 20 is transferred to a hard die 32 for superplastic forming as shown in FIG. 7. The die 32 has a cavity 34 designed to match the desired final design shape of the hollow airfoil. Pressure is applied internally of the sealed in-process assembly 20 via the inflation port 26 and the inflation manifold 24 (neither shown in FIG. 7). The in-process assembly 20 inflates to fill the die cavity 34 under the internal pressure, thereby superplastically deforming to the desired final design shape. The inflation process is carried out at a temperature in the range of approximately 1500°–1700° F., preferably 1650° F. The pressure is applied at a ramp rate of preferably 5 psig per minute or at least in the range of 1–20 psig per minute. The ramp rate must be such as to maintain the superplasticity of the parts. Typically, a strain rate in the range of $10^{-5}$ to $10^{-3}$ inches per inches per second is needed for titanium alloys. The pressure is raised to a maximum pressure in the range of 60–500 psig, preferably about 300 psig. The pressure is maintained for up to two and a half hours including the initial pressure build up.

The time, temperature and pressure conditions for diffusion bonding and superplastic forming described above can of course be varied as long as they are maintained within a suitable range, i.e., in which the conditions would be sufficient to induce diffusion bonding and superplastic forming. The conditions will also vary depending on factors such as the type of materials selected and the thickness of the pieces.

Figure 8:
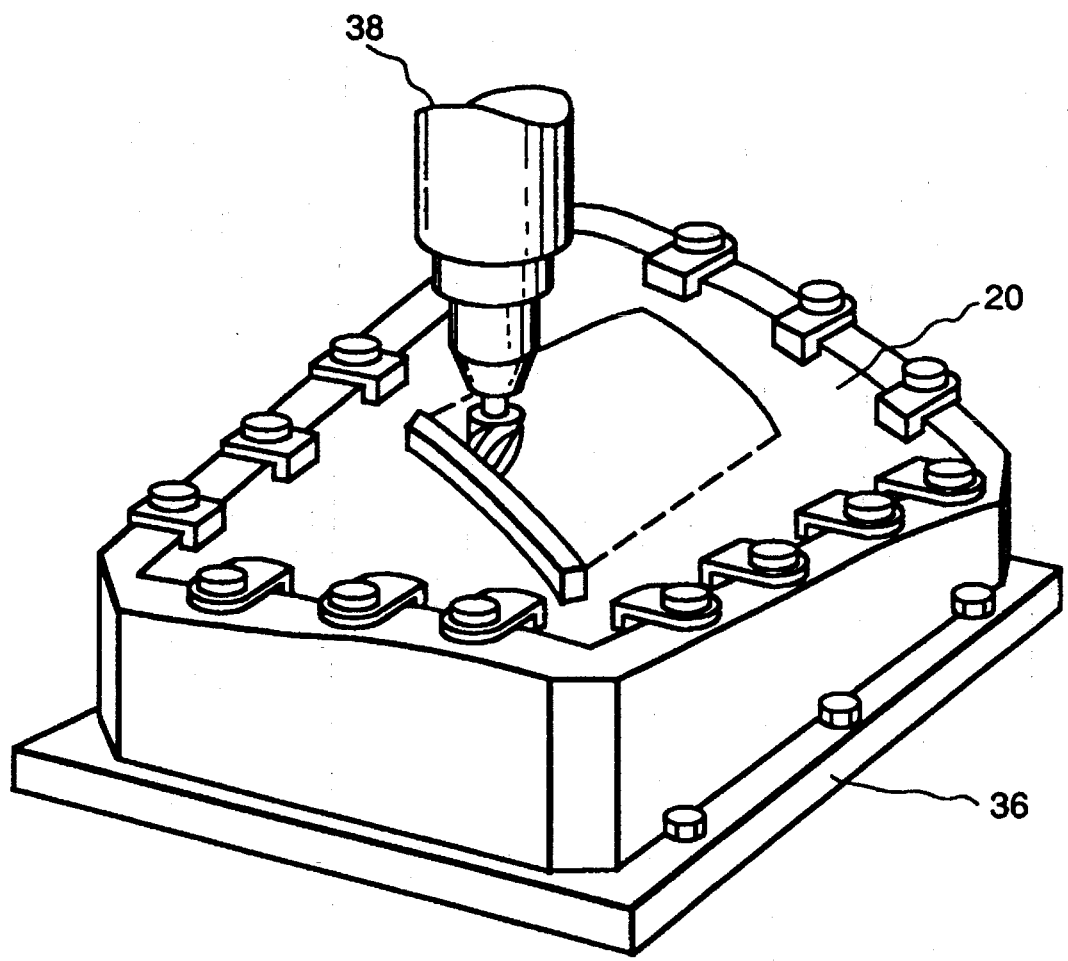
FIG. 8 shows the final machining step of the present invention.

FIG. 8 shows the final step in which excess material is machined off of the inflated in-process assembly 20 to achieve the final, desired shape (shown in dotted lines in FIG. 8). The in-process assembly 20 is secured in a nest fixture 36 and a mill 38 is used to trim off the extra material. Prior to the final machining of the excess material, the inflated in-process assembly 20 may be subjected to hot isostatic pressing to remove any undesired voids that may exist. The hot isostatic pressing is carried out at approximately 5,000–15,000 psig while maintaining an equalized pressure between the interior and exterior of the inflated in-process assembly. The pressure is maintained for at least one hour, and preferably for about 2–4 hours, at a temperature in the range of about 1700°–1750° F.

FIGS. 9a and 9b show a variation to the method of FIGS. 1–8. In this variation, the diffusion bonding and superplastic forming steps can be carried out in a single tool. A hard die 40 is provided having a cavity 42 designed to match the desired final design shape of the hollow airfoil. A plurality of passages 44 is provided in the hard die 40 in order to permit the die cavity 42 to be submitted to pressure and to be vented. As seen in FIG. 9a, the in-process assembly 20 is situated in the hard die 40. A vacuum is applied to the inflation port 26 (not shown in FIGS. 9a and 9b). A source of gas pressure is applied to the passages 44 causing the in-process assembly 20 to be externally pressured. As in the first embodiment described above, a pressure in the range of 60–500 psig at a temperature in the range of approximately 1600°–1800° F. is externally applied to the assembly 20 for up to three and a half hours to complete diffusion bonding.

In FIG. 9b, the source of gas pressure is removed from the passages 44 and the passages 44 are vented to the atmosphere. A source of pressure is now applied to the inflation port 26 in order to internally pressurize the in-process assembly 20. As before, the inflation process is carried out at a temperature in the range of 1500°–1700° F. with a maximum pressure in the range of 60–500 psig for up to two and a half hours (including an initial pressure ramp rate of approximately 1–20 psig per minute).

The foregoing has described a method of manufacturing a two-piece hollow airfoil using diffusion bonding and superplastic forming techniques which overcomes the problem of deformation-induced instabilities.

While specific embodiments of the present invention have been described, it will be apparent to those skilled in the art that various modifications thereto can be made without departing from the spirit and scope of the invention as defined in the appended claims.

What is claimed is:

1. A method of making hollow airfoils from two pieces comprising the steps of:

providing each of said two pieces with an initial camber and twist;

machining a series of raised ribs on the exterior sides of each of said two pieces;

joining said two pieces together into an assembly; and applying internal pressure to said assembly so that said assembly superplastically deforms into a hollow airfoil.

2. The method of claim 1 wherein the step of joining said two pieces together comprises applying stopoff to selected portions on the interior side of at least one of said two pieces, arranging said two pieces together with their interior sides in contact, sealing said two pieces together around their peripheries, and applying a sufficient external pressure to said two pieces so that portions of said pieces lacking stopoff diffusion bond together.

3. The method of claim 2 wherein the step of applying a sufficient external pressure to said two pieces comprises applying pressure in the range of 60–500 psig at a temperature in the range of 1600°–1800° F. for up to three and a half hours.

4. The method of claim 1 wherein the step of applying internal pressure to said assembly comprises applying pressure at a ramp rate of approximately 1–20 psig per minute to a maximum pressure in the range of 60–500 psig at a temperature in the range of 1500°–1700° F. for a total of up to two and a half hours.

5. A method of making hollow airfoils having a desired shape comprising the steps of:

forming a first sheet into a predetermined in-process shape, said first sheet having an interior side, an exterior side and a mean camber and twist;

forming a second sheet into a predetermined in-process shape, said second sheet having an interior side, an exterior side and a mean camber and twist;

machining a series of raised ribs onto said exterior sides of each of said first and second sheets;

applying stopoff to selected portions of said interior side of at least one of said first and second sheets;

arranging said first and second sheets with their interior sides in contact to form an in-process assembly;

applying external pressure to said in-process assembly so that portions of said interior sides of said first and second sheets lacking stopoff diffusion bond together; and applying internal pressure to said in-process assembly so that said in-process assembly superplastically deforms to the desired shape.

6. The method of claim 5 further comprising the step of machining off excess material after said in-process assembly is superplastically deformed.

7. The method of claim 5 wherein the step of arranging said first and second sheets to form an in-process assembly further comprises sealing said first and second sheets together by welding around their peripheries.

8. The method of claim 5 wherein the step of applying external pressure to said in-process assembly comprises placing said in-process assembly into an autoclave and applying a pressure in the range of approximately 60–500 psig for up to three and a half hours.

9. The method of claim 8 wherein the step of applying external pressure to said in-process assembly is carried out at a temperature in the range of 1600°–1800° F.

10. The method of claim 5 wherein the step of applying internal pressure to said in-process assembly comprises placing said in-process assembly in a die and applying pressure to the cavities at a ramp rate of approximately 1–20 psig per minute to a maximum in the range of 60–500 psig for a total of up to two and a half hours.

11. The method of claim 10 wherein the step of applying internal pressure said in-process assembly is carried out at a temperature in the range of 1500°–1700° F.

12. The method of claim 5 wherein the step of applying external pressure to said in-process assembly comprises placing said in-process assembly into a die having a die cavity and passage means for permitting fluid communication between said die cavity and the atmosphere and applying a pressure in the range of 60–500 psig in said die cavity for up to three and a half hours via said passage means.

13. The method of claim 12 wherein the step of applying external pressure to said in-process assembly is carried out at a temperature in the range of 1600°–1800° F.

14. The method of claim 12 wherein the step of applying internal pressure to said in-process assembly comprises leaving said in-process assembly in said die, venting said die cavity to the atmosphere via said passage means, and applying internal pressure to said in-process assembly at a ramp rate of approximately 1–20 psig per minute to a maximum in the range of 60–500 psig for a total of up to two and a half hours.

15. The method of claim 14 wherein the step of applying internal pressure to said in-process assembly is carried out at a temperature in the range of 1500°–1700° F.

16. The method of claim 5 wherein the steps of forming said first and second sheets into predetermined in-process shapes comprise hot forming said first and second sheets in a hot form press.

17. The method of claim 16 wherein the steps of forming said first and second sheets into predetermined in-process shapes further comprise superplastic forming said first and second sheets with a superplastic forming tool after the steps of hot forming said said first and second sheets in a hot form press.

18. The method of claim 5 wherein the steps of forming said first and second sheets into predetermined in-process shapes comprise near-net-shape forging said first and second sheets in a forge press.

19. The method of claim 5 further comprising using titanium-based alloy sheets for said first and second sheets.

* * * * *